United States Patent [19]

Cush

[11] Patent Number: 4,490,488
[45] Date of Patent: Dec. 25, 1984

[54] SILICONE ELASTOMER FORMING COMPOSITIONS

[75] Inventor: Roger J. Cush, Cardiff, Wales

[73] Assignee: Dow Corning Limited, Barry, Wales

[21] Appl. No.: 594,186

[22] Filed: Mar. 28, 1984

[30] Foreign Application Priority Data

Apr. 5, 1983 [GB] United Kingdom ............... 8309230

[51] Int. Cl.³ .............................................. C08J 9/10
[52] U.S. Cl. ...................................... 521/88; 521/89; 521/117; 521/121; 521/154
[58] Field of Search ................... 521/88, 89, 117, 121, 521/154

[56] References Cited

U.S. PATENT DOCUMENTS

| | | | |
|---|---|---|---|
| 2,857,343 | 10/1958 | Berridge | 260/2.5 |
| 2,951,819 | 9/1960 | Wade | 521/154 |
| 3,425,967 | 2/1969 | Modic | 260/2.5 |
| 3,677,981 | 7/1972 | Wade et al. | 521/154 |
| 4,024,091 | 5/1977 | Lee et al. | 521/154 |
| 4,026,843 | 5/1977 | Kittle | 521/154 |
| 4,026,844 | 5/1977 | Kittle et al. | 521/154 |
| 4,026,846 | 5/1977 | Lee et al. | 521/154 |

FOREIGN PATENT DOCUMENTS 798669 7/1958 United Kingdom .
1301152 12/1972 United Kingdom .

*Primary Examiner*—Morton Foelak
*Attorney, Agent, or Firm*—Robert Spector

[57] ABSTRACT

Composition which comprises a mixture of (A) a polydiorganosiloxane having a viscosity of from 200 to 100,000 cP at 25° C. and having at least two silicon-bonded vinyl groups, (B) an organohydrogensiloxane, (C) a platinum catalyst, (D) a substance which inhibits the reaction between (A) and (B) in the presence of (C) e.g. an acetylenic alcohol, and (E) a blowing agent selected from p,p'-oxybis(benzenesulphonylhydrazide) and dinitrosopentamethylene tetramine.

The composition can be converted by heat into an elastomeric sponge and is useful for the production of articles such as seat cushions, heat and sound insulation and shock absorbers.

10 Claims, No Drawings

SILICONE ELASTOMER FORMING COMPOSITIONS

This invention relates to compositions which are convertible to elastomeric foams and also relates to a process for preparing such elastomeric foams.

The production of foamed silicone rubber for a variety of applications has been known for at least twenty years. The methods of inducing foaming of the compositions have fallen into two general types. In one type of system the composition contains an added blowing agent which is activated at elevated temperatures. In this case the cure system is also heat-activated and generally relies on the presence of one or more organic peroxides or per esters as the curing agent. This method is disclosed in, for example, U.S. Pat. No. 2,857,343. According to a second method of producing silicone elastomer foams the cure mechanism involves the reaction at normal ambient temperatures of a polydiorganosiloxane having silanol groups with an organohydrogen-polysiloxane. As the cure reaction proceeds hydrogen is evolved and causes expansion of the composition to a cellular structure. Such a method is described in British Pat. No. 798,669.

Another method of preparing silicone rubbers which has achieved commercial importance involves the reaction of an organosiloxane having ≡SiH groups with a polydiorganosiloxane having silicon-bonded substituents containing olefinic unsaturation. The reaction is catalysed by a platinum compound or complex and curing of the composition occurs at normal ambient temperatures. In British Pat. No. 1,137,420 there are disclosed foamable silicone compositions comprising (1) a vinyl chain-stopped polysiloxane (2) an organopolysiloxane copolymer comprising $R''_3SiO_{0.5}$ units and $SiO_2$ units, wherein R" is selected from vinyl radicals and monovalent hydrocarbon radicals free of aliphatic unsaturation (3) an inorganic fibrous material selected from asbestos and fibrous potassium titanate (4) optionally a finely-divided inorganic filler (5) a platinum catalyst (6) a liquid organohydrogenpolysiloxane and (7) a blowing agent. However, as disclosed in the said patent the curing reaction takes place at room temperature. It is thus necessary to use the composition within a short time once the ingredients are mixed. Such compositions, therefore, are not well suited for use in applications which require a prolonged delay between mixing and curing, for example where the composition is to be subjected to further processing steps in the uncured state. It is suggested in British Pat. No. 1,137,420 that premature curing may be avoided by refrigerating the mixture. However, such a method requires additional equipment and is generally impracticable on a commercial scale where large amounts of product are involved.

Similar considerations apply with regard to the compositions disclosed in British Pat. No. 1,301,152 which comprise a mixture of (a) a diorganopolysiloxane gum having vinyl siloxane units, (b) a diorganosiloxane having a viscosity of at least 10 cS at 25° C. and vinyl siloxane units in a proportion of at least 10 times the molar percentage of vinyl siloxane units in (a), (c) an organohydrogenpolysiloxane, (d) a silica filler, (e) a blowing agent, and (f) a platinum compound. In addition, such compositions require careful control of processing conditions if satisfactory foam structures are to be realised.

There has therefore existed a need for a composition which is stable and which can be processed at normal room temperatures but which is readily converted to an elastomeric sponge at elevated temperatures.

Accordingly the present invention provides a composition which is convertible to a silicone elastomeric foam and which comprises (A) a triorganosiloxy end-blocked polydiorganosiloxane wherein the organic substituents are selected from methyl, vinyl, phenyl and 3.3.3-trifluoropropyl groups, at least 50% of the total substituents being methyl, up to one percent of the total silicon atoms in the polydiorganosiloxane having a vinyl group attached thereto, with the proviso that there are present on average at least two vinyl groups per molecule, the viscosity of the polydiorganosiloxane falling within the range from 200 to 100,000 cP at 25° C., (B) an organohydrogensiloxane having on average more than two silicon-bonded hydrogen atoms per molecule, the organo substituents being selected from alkyl groups having from 1 to 6 carbon atoms and phenyl groups, there being sufficient organohydrogensiloxane to provide from 0.5 to 3 hydrogen atoms per vinyl group in (A), (C) a platinum compound or complex in an amount sufficient to catalyse the reaction between (A) and (B), (D) a substance which inhibits the reaction between (A) and (B) in the presence of (C), and (E) from 0.2 to 10 percent by weight, based on the total composition of a blowing agent selected from p,p'-oxybis(benzenesulphonylhydrazide) and dinitrisopentamethylene tetramine.

The vinyl-containing polydiorganosiloxanes (A) may vary from freely flowing liquids to highly viscous substances, those having a viscosity in the range from 200 to 50,000 cP at 25° C. being preferred. They are well known in the art and can be prepared by well-established techniques, for example of the equilibration of the appropriate cyclic siloxane(s) with an organodisiloxane. Subject to the presence of an average of at least two silicon-bonded vinyl groups per molecule up to 1 percent of the total silicon atoms in the polydiorganosiloxane may have a vinyl group attached thereto; and not more than one vinyl group should be attached to any silicon atom. At least 50 percent of the total substituents in the polydiorganosiloxane are methyl groups, the remaining substituents being the above-specified vinyl groups with or without one or both of phenyl and 3,3,3-trifluoropropyl groups. Preferably the proportion of any phenyl groups present should not exceed about 10% of the total number of organic substituents in the polydiorganosiloxane. The triorganosiloxy end-blocking groups may be, for example, trimethylsiloxy, dimethylvinylsiloxy, dimethylphenylsiloxy or methylphenylvinylsiloxy. The preferred polydiorganosiloxanes (A) are those having on average two vinyl groups per molecule, each of the said vinyl groups being present in an end-blocking triorganosiloxy group, that is being attached to a terminal silicon atom. Examples of the preferred polydiorganosiloxanes are methylphenylvinylsiloxy-terminated polydimethylsiloxanes, dimethylvinylsiloxy-terminated polydimethylsiloxanes and dimethylvinylsiloxy-terminated copolymers of dimethylsiloxane and methylphenylsiloxane units.

The organohydrogensiloxanes (B) are also well-known in the art. They can be any organosiloxane having on average more than two silicon-bonded hydrogen atoms per molecule and wherein the remaining silicon-bonded substituents are selected from alkyl groups having from 1 to 6 carbon atoms and phenyl groups. They can be homopolymers, copolymers or mixtures thereof which comprise units such as $R_2SiO$, $R_3SiO_{\frac{1}{2}}$, RHSiO, $HSiO_{\frac{3}{2}}$, $R_2HSiO_{\frac{1}{2}}$ and $SiO_2$ where in R represents a $C_{1-6}$ alkyl or phenyl group but is preferably methyl. Specific examples or organohydrogen siloxanes (B) are copolymers of trimethylsiloxane units and methylhydrogensiloxane units, copolymers of trimethylsiloxane, dimethylsiloxane and methylhydrogen siloxane units, cyclic methylhydrogensiloxanes and copolymers of dimethylhydrogensiloxane units, dimethylsiloxane units and methylhydrogensiloxane units. The organohydrogensiloxanes preferably have at least 5 silicon-bonded hydrogen atoms per molecule and are most preferably copolymers of trimethylsiloxane units, methylhydrogensiloxane units and, optionally, dimethylsiloxane units having a viscosity of from about 15 to about 500 cP at 25° C.

The proportion of organohydrogensiloxane employed should be sufficient to provide at least 0.5 and up to 3 silicon-bonded hydrogen atoms per vinyl group in (A).

Component (C) of the compositions of this invention can be any platinum compound or complex which is effective in catalysing the reaction between the vinyl groups in (A) and the silicon-bonded hydrogen atoms in (B). The addition of SiH groups to unsaturated aliphatic groups is well known in the art of organosilicon chemistry as also are a variety of platinum catalysts for the reaction. Such catalysts are well-documented in the art and include chloroplatinic acid, platinum acetylacetonate, complexes of platinous halides with unsaturated compounds such as ethylene, propylene, organovinylsiloxanes and styrene, hexamethyldiplatinum, $PtCl_2.PtCl_3$ and $Pt(CN)_3$. The preferred platinum catalysts are complexes of platinum compounds and vinyl siloxanes e.g. those formed by the reaction of chloroplatinic acid and divinyltetramethyl disiloxane. Sufficient of the platinum should be employed to provide a homogenous and effective cure of the composition. The preferred proportion of platinum catalyst is usually that which will provide from about 1 to about 40 parts by weight of Pt per million parts by weight of (A) and (B).

As component (D) of the compositions of this invention there is employed a substance which inhibits the platinum-catalysed reaction of (A) and (B). Such substances are effective in substantially preventing the cure reaction at normal ambient temperatures i.e. about 20°–25° C. but allow curing to take place at temperatures above about 100° C. Specific examples of such substances are benzotriazole, nitrile compounds, halocarbons, certain amines, sulphoxides and stannous, mercuric and bismuth salts, the preferred inhibitors being the acetylenic alcohols as described in British Pat. No. 1,141,868. Examples of such alcohols are 3-methyl-1-pentyn-3-ol, 3-phenyl-1-butyn-3-ol, 3-methyl-1-butyn-3-ol and 1-ethynylcyclohexan-1-ol. Such inhibiting substances are usually effective in very small proportions, from 0.01 to 1% by weight, based on total composition weight, being appropriate for most applications.

As the blowing agent the compositions of this invention contain either or both of p,p'-oxybis(benzenesulphonylhydrazide) and dinitrosopentamethylene tetramine. Certain other substances, e.g. azo-bisisobutyronitrile, azodicarbonamide and p-toluene sulphonyl hydrazide are known as blowing agents for silicon rubbers. However, such substances have been found to be totally unsuitable for use as blowing agents in the compositions of the present invention. The blowing agent is employed in an amount of from 0.2 to 10 percent by weight, preferably 0.5 to 5.0 percent by weight, based on the total weight of the composition. Preferably the blowing agent is employed in conjunction with an activator therefor. Examples of suitable activators are zinc oxide, titanium dioxide, dibasic lead phthalate and metal stearates e.g. zinc stearate in the case of p,p'-oxybis(benzenesulphonyl hydrazide), and stearic acid, oleic acid and salicyclic acid in the case of dinitrosopentamethylene tetramine. The proportion of activator employed will normally range from about 0.01 to 5% by weight based on the total weight of the composition.

For most applications it is preferred that the compositions contain a finely-divided filler to impart improved physical properties and the desired flow characteristics. Examples of such fillers are reinforcing silica fillers, which may be prepared by fume or other processes (e.g. by precipitation), carbon black, alumina, diatomaceous earths, crushed quartz and calcium carbonate. Usually at least a part of the filler content will comprise a reinforcing silica, which may be treated. Methods for treating reinforcing silicas with organosilicon compounds and other treating agents are well known in the silicone rubber art. The amount of filler employed will depend on the properties desired in the foamable composition and in the cured, foamed product but will, in general, fall within the range from about 5 to about 60 percent of the total weight of the composition.

In addition to the ingredients specified hereinabove the compositions of this invention may also contain other additives for achieving certain properties in the finished elastomer, for example pigments, antioxidants, compression set additives and heat stability additives.

The compositions of this invention may be prepared by mixing the ingredients employing conventional silicone rubber compounding techniques. Thus, for example, the compositions may be mixed employing a dough mixer or a rubber mill. When the composition is to be stored or transported long distances prior to use it is preferred to package the composition in two parts, the platinum catalyst and the organohydrogensiloxane not being present in the same package.

Expansion and curing of the foamable compositions into a silicone sponge may be carried out by heating the compositions to a temperature of at least 120° C. and up to about 300° C., preferably within the range from 150°–200° C. Depending on the temperatures employed and the nature of the composition the cure time may vary from about 1 minute to more than one hour. If desired the foamed product may be subjected to a post cure step. Depending on the intended use the composition may be placed in a mould prior to expansion or may be allowed to expand freely.

The compositions of this invention are particularly suitable for use as injection moulding materials and may be employed in a variety of applications, for example for the production of sponge blocks, moulded articles such as seat cushions, heat and sound insulation and shock absorbers. They may also be coated on to substrates to produce, for example, fabrics having thereon a layer of elastomeric sponge.

The following example, in which the parts are expressed by weight, illustrates the invention.

EXAMPLE

A base formulation was prepared by mixing 58 parts of a methylphenylvinylsiloxy-terminated polydimethylsiloxane having a viscosity of about 2,000 cP at 25° C., 15 parts of 5 micron ground quartz, 10 parts of hexamethyldisilazane, 20 parts of a fume silica, 0.05 part of 3-methyl-1-butyn-3-ol, 0.30 part of a chloroplatinic acid complex with divinyltetramethyldisiloxane and 3 parts of a copolymer having on average 4 dimethylsiloxane units, 7 methylhydrogensiloxane units and 2 trimethylsiloxy end-blocking units.

Into 100 part portions of this base formulation were mixed the following blowing agents in the proportions indicated and the resulting compositions cured in aluminium containers in an oven at 200° C. for 5 minutes.

| | | |
|---|---|---|
| (a) Azodicarbonamide | 1.5 | parts |
| (b) P-toluenesulphonyl hydrazide | 1.5 | " |
| (c) Modified azodicarbonamide (with activator) | 1.5 | " |
| (d) Azobis-isobutyronitrile | 1.5 | " |
| (e) Benzene-sulphonyl-hydrazide | 1.5 | " |
| (f) P,P'-oxybis(benzenesulphonyl)-hydrazide | 1.5 | " |
| (g) P,P'-oxybis(benzenesulphonyl)-hydrazide | 3.0 | " |
| (h) As (f) plus 0.40 part of zinc oxide as activator | 1.9 | " |
| (i) Dinitrosopentamethylene tetramine | 1.5 | " |
| (j) Dinitrosopentamethylene tetramine | 3.0 | " |
| (k) as (i) plus 0.15 part stearic acid as activator | 1.65 | " |

It was found that formulations (a), (b) and (c) did not cure; a foam was formed but the product remained tacky with no strength. Formulations (d) and (e) showed almost complete inhibition of cure and the foamed products were soft and sticky to the touch.

Formulations (f), (g) and (i) gave cured, resilient foams with (g) being less resilient than (f) and (i). Formulations (h), (j) and (k) produced resilient foams similar to (f) but with increased expansion (lower density).

That which is claimed is:

1. A composition convertible to a silicone elastomeric foam and which comprises (A) a triorganosiloxy end-blocked polydiorganosiloxane wherein the organic substituents are selected from methyl, vinyl, phenyl and 3.3.3-trifluoropropyl groups, at least 50% of the total substituents being methyl, up to one percent of the total silicon atoms in the polydiorganosiloxane having a vinyl group attached thereto, with the proviso that there are present on average at least two vinyl groups per molecule, the viscosity of the polydiorganosiloxane falling within the range from 200 to 100,000 cP at 25° C., (B) an organohydrogensiloxane having an average more than two silicon-bonded hydrogen atoms per molecule, the organo substituents being selected from alkyl groups having from 1 to 6 carbon atoms and phenyl groups, there being sufficient organohydrogen siloxane to provide from 0.5 to 3 hydrogen atoms per vinyl group in (A), (C) a platinum compound or complex in an amount sufficient to catalyse the reaction between (A) and (B), (D) a substance which inhibits the reaction between (A) and (B) in the presence of (C), and (E) from 0.2 to 10 percent by weight, based on the total composition of a blowing agent selected from p,p'-oxybis(benzenesulphonylhydrazide) and dinitrisopentamethylene tetramine.

2. A composition as claimed in claim 1 wherein the polydiorganosiloxane (A) has a viscosity in the range from 200 to 50,000 cP at 25° C.

3. A composition as claimed in claim 2 wherein the polydiorganosiloxane (A) has on average two vinyl groups per molecule, one vinyl group being attached to each terminal silicon atom.

4. A composition as claimed in claim 1 wherein the inhibitor (D) is an acetylenic alcohol.

5. A composition as claimed in claim 2 wherein the blowing agent (E) is present in an amount of from 0.5 to 5 percent by weight based on the total weight of the composition.

6. A composition as claimed in claim 1 wherein there is also present an activator for the blowing agent (E).

7. A composition as claimed in claim 1 which also comprises a filler.

8. A process for the preparation of an elastomeric foam which comprises mixing together (A) a polydiorganosiloxane wherein the organic substituents are selected from methyl, vinyl, phenyl and 3.3.3-trifluoropropyl groups, at least 50% of the total substituents being methyl, up to one percent of the total silicon atoms in the polydiorganosiloxane having a vinyl group attached thereto, with the proviso that there are present on average at least two vinyl groups per molecule, the viscosity of the polydiorganosiloxane falling within the range from 200 to 100,000 cP at 25° C., (B) an organohydrogensiloxane having on average more than two silicon-bonded hydrogen atoms per molecule, the organo substituents being selected from alkyl groups having from 1 to 6 carbon atoms and phenyl groups, there being sufficient organohydrogensiloxane to provide from 0.5 to 3 hydrogen atoms per vinyl group in (A), (C) a platinum compound or complex in an amount sufficient to catalyse the reaction between (A) and (B), (D) a substance which inhibits the reaction between (A) and (B) in the presence of (C), and (E) from 0.2 to 10 percent by weight, based on the total composition of a blowing agent selected from p,p'-oxybis(benzenesulphonylhydrazide) and dinitrosopentamethylene tetramine and thereafter heating the composition to a temperature of at least 120° C.

9. A process as claimed in claim 8 wherein the polydiorganosiloxane (A) has a viscosity in the range from 200 to 50,000 cP at 25° C.

10. A process as claimed in claim 9 wherein the composition also contains an activator for the blowing agent (E).

* * * * *